US 8,297,049 B2

(12) United States Patent
Ohtani

(10) Patent No.: US 8,297,049 B2
(45) Date of Patent: Oct. 30, 2012

(54) EXHAUST GAS HEAT RECOVERY DEVICE

(75) Inventor: Teturo Ohtani, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 603 days.

(21) Appl. No.: 12/293,128

(22) PCT Filed: Mar. 12, 2007

(86) PCT No.: PCT/JP2007/055327
§ 371 (c)(1),
(2), (4) Date: Sep. 16, 2008

(87) PCT Pub. No.: WO2007/105815
PCT Pub. Date: Sep. 20, 2007

(65) Prior Publication Data
US 2009/0038302 A1 Feb. 12, 2009

(30) Foreign Application Priority Data

Mar. 16, 2006 (JP) .................................. 2006-072704
Apr. 19, 2006 (JP) .................................. 2006-115819

(51) Int. Cl.
*F01N 1/00* (2006.01)
*F28F 13/00* (2006.01)
*F28F 27/02* (2006.01)
*F28D 7/10* (2006.01)
(52) U.S. Cl. .......... 60/317; 165/103; 165/135; 165/157; 60/320

(58) Field of Classification Search .................... 60/320, 60/317, 321; 165/102, 103, 155, 157, 154, 165/165, 51, 141, 104.19, 135
See application file for complete search history.

(56) References Cited

U.S. PATENT DOCUMENTS 2,611,585 A * 9/1952 Boling .......................... 165/164
2,794,625 A * 6/1957 Sealey ............................ 165/47
(Continued)

FOREIGN PATENT DOCUMENTS

DE 199 02 290 A1 7/2000
(Continued)

OTHER PUBLICATIONS

Notice of Reasons for Rejection for JP 2006-072704, dated Oct. 20, 2009.

*Primary Examiner* — Kenneth Bomberg
*Assistant Examiner* — Abdul Elnoubi
(74) *Attorney, Agent, or Firm* — Finnegan, Henderson, Farabow, Garrett & Dunner, LLP

(57) ABSTRACT

An exhaust heat recovery device with which a coolant medium in a heat exchanger can be prevented from reaching high temperatures is provided. An exhaust heat recovery system 10 is provided with an heat exchanger 18 that performs heat exchange between exhaust gas and a coolant medium; and a natural convection water pipe 56 whose one end is connected to an upper portion in the direction of gravity of an engine coolant water pipe 42 in the heat exchanger 18 and whose other end is connected to a lower portion in the direction of gravity of the engine coolant water pipe 42, and whose intermediate portion is positioned at the outer side of the heat exchanger 18.

7 Claims, 7 Drawing Sheets

U.S. PATENT DOCUMENTS

| | | | |
|---|---|---|---|
| 2,937,626 A * | 5/1960 | Mccorquodale Simpson | 122/140.1 |
| 6,330,910 B1 * | 12/2001 | Bennett | 165/297 |
| 6,374,598 B1 * | 4/2002 | Neuschwander | 60/298 |
| 6,684,938 B2 * | 2/2004 | Tsujita et al. | 165/51 |
| 6,892,797 B2 * | 5/2005 | Beddome et al. | 165/81 |
| 2005/0039729 A1 * | 2/2005 | Rosin et al. | 123/568.12 |
| 2005/0133202 A1 * | 6/2005 | Jorgensen et al. | 165/103 |
| 2006/0090880 A1 * | 5/2006 | Sugihara et al. | 165/103 |

FOREIGN PATENT DOCUMENTS

| | | |
|---|---|---|
| FR | 2 859 239 | 3/2005 |
| JP | A 58-221381 | 12/1983 |
| JP | U 63-118324 | 7/1988 |
| JP | 2000356181 A * | 12/2000 |
| JP | 2002-147291 | 5/2002 |
| JP | 2004-293395 | 10/2004 |
| WO | WO 00/26514 | 5/2000 |

* cited by examiner

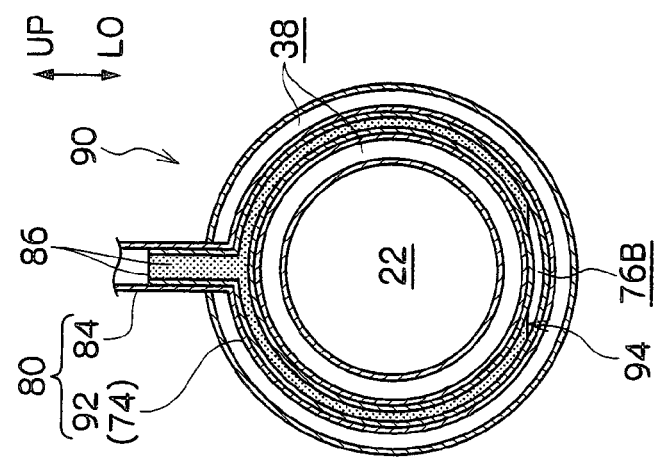
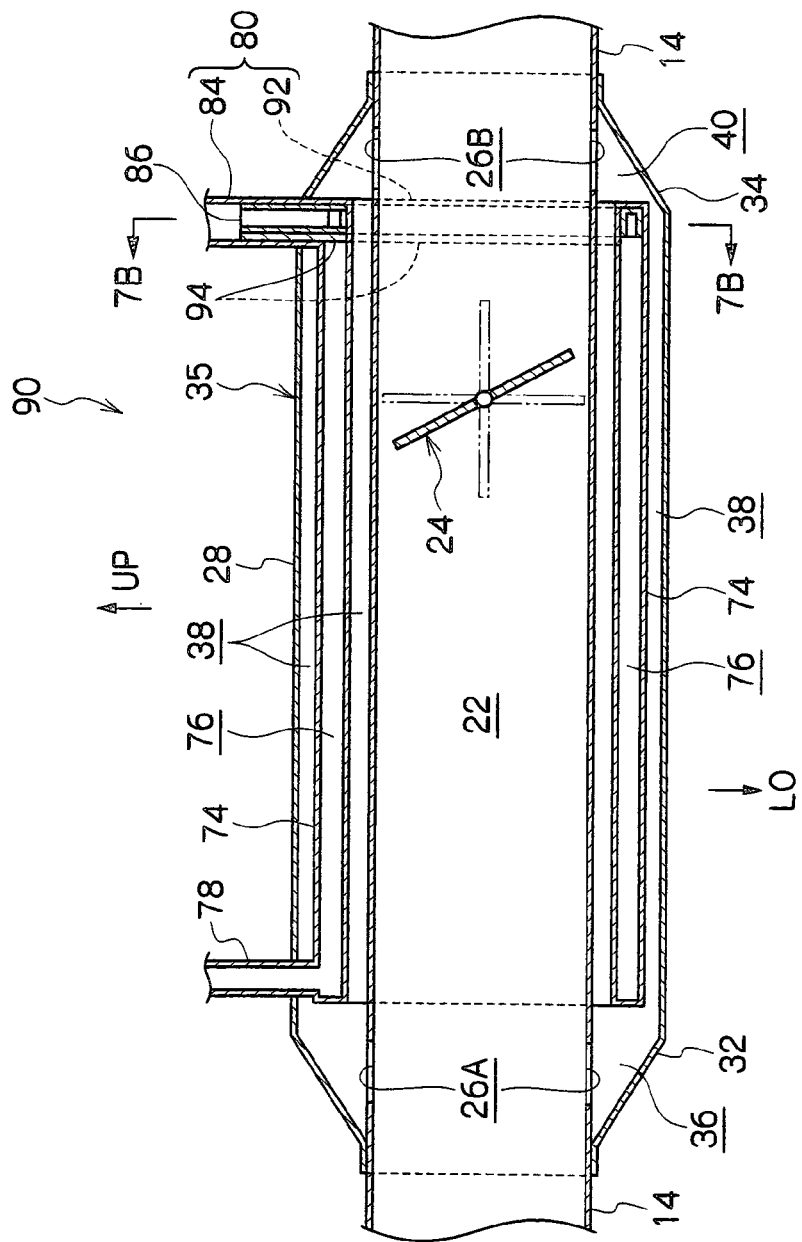

EXHAUST GAS HEAT RECOVERY DEVICE

CROSS-REFERENCE TO RELATED APPLICATIONS

This application is a national phase application of International Application No. PCT/JP2007/055327, filed Mar. 12, 2007, and claims the priority of Japanese Application Nos. 2006-072704, filed Mar. 16, 2006, and 2006-115819, filed Apr. 19, 2006, the contents of all of which are incorporated herein by reference.

FIELD OF THE INVENTION

The present invention relates to an exhaust heat recovery device that performs heat exchange between exhaust gas (e.g., that of an automobile) and coolant and recovers heat from the exhaust gas.

TECHNICAL BACKGROUND

As shown in Japanese Patent Application Laid-open (JP-A) Nos. 2004-293395 And 2002-147291, an exhaust cooling unit for an engine is known where a double-pipe structure has an inner pipe and an outer pipe in which an exhaust control valve is arranged at the upstream side in the interior thereof. An exhaust cooler is arranged between the inner and outer pipes and this performs heat exchange between a coolant water and exhaust gas.

DISCLOSURE OF THE INVENTION

With technologies such as those referred to above, when the engine is stopped, circulation of the coolant water stops at a coolant water path in the exhaust cooler. The temperature of the coolant water may rise to be boiled due to residual heat.

The present invention was made in light of the above-described circumstances, and provides an exhaust heat recovery device with which temperature increases in the coolant inside a heat exchanger can be prevented.

Means for Addressing the Subjects

In order to attain the above-described objective, the exhaust heat recovery device according to a first aspect of the present invention comprises a heat exchanger that performs heat exchange between exhaust gas and a coolant medium; and a natural convection channel whose one end is connected to an upper portion in the direction of gravity of a coolant medium channel in the heat exchanger and another end is connected to a lower portion in the direction of gravity of the coolant medium channel.

With the exhaust heat recovery device of the first aspect, the coolant medium channel of the heat exchanger and the natural convection channel form natural convection circulation route where a coolant medium can circulate due to natural convection (i.e., differences in relative density). The natural convection channel links the upper and lower portions of the coolant medium channel in the direction of gravity Due to a temperature difference of the coolant medium in this natural convection circulation route, the coolant medium circulates through natural convection circulation route. Due to this, even if the configuration is such that it does not cause forced flow in the coolant medium channel in the heat exchanger, accumulation of the coolant medium in the vicinity of the high-temperature portion of the heat exchanger is prevented. Accordingly, the coolant medium does not reach high temperatures.

In this manner, with the exhaust heat recovery device of the first aspect, the coolant medium inside the heat exchanger can be prevented from reaching high temperatures.

A second aspect of the present invention comprises the exhaust heat recovery device of the first aspect, wherein an intermediate portion of the natural convection channel is positioned at an outer side of the heat exchanger.

With the exhaust heat recovery device according to the second aspect of the present invention, the intermediate portion of the natural convection channel is positioned at the outer side of the heat exchanger. When the coolant medium circulates through the natural convection circulation channel, heat is dispersed at the intermediate portion of the natural convection channel. Due to this, the coolant medium can be effectively prevented from reaching high temperatures.

A third aspect of the present invention comprises the exhaust heat recovery device of the first or second aspects, wherein the heat exchanger has a heat exchange unit that performs heat exchange between the exhaust gas and the coolant medium and is formed at a periphery of an bypass unit arranged along the horizontal direction. The heat exchanger is configured to be switchable between a state where exhaust gas flows through the bypass and a state where the exhaust gas flows through the heat exchange unit.

With the exhaust heat recovery device of the third aspect, a cylindrical heat exchange unit is formed along the horizontal direction at the periphery of an arranged bypass unit. A coolant medium channel is arranged at this heat exchanging unit so that it can perform heat exchange with exhaust gas. With this configuration, the exhaust gas amount relative to the coolant medium amount in the heat exchanger is great. Even in such the configuration having much heat amount, the coolant medium circulating in the natural convection circulation route can be prevented from reaching high temperatures without depending on forced flow of the coolant medium.

An exhaust heat recovery device according to a fourth aspect of the present invention comprises a heat exchanger that performs heat exchange between exhaust gas and a coolant medium; and a natural convection channel whose one end is connected to an upper portion in the direction of gravity of a coolant medium channel in the heat exchanger and whose another end is connected to a lower portion in the direction of gravity of the coolant medium channel, and whose intermediate portion is positioned at an outer side of the heat exchanger.

With the exhaust heat recovery device of the fourth aspect, the coolant medium channel of the heat exchanger and the natural convection channel form natural convection circulation route where a coolant medium can circulate due to natural convection (i.e., differences in relative density). The natural convection channel links the upper and lower portions of the coolant medium channel in the direction of gravity. Since the intermediate portion of the natural convection channel is positioned at the outer side of the heat exchanger, when the coolant medium circulates in the natural convection circulation channel, it releases heat at the intermediate portion of the natural convection channel and to be cooled. Although the configuration is such that it does not cause forced flow in the coolant medium channel in the heat exchanger, accumulation of the coolant medium in the vicinity of the high-temperature portion of the heat exchanger is prevented and the coolant medium does not reach high temperatures.

In this manner, with the exhaust heat recovery device of the fourth aspect, the coolant medium inside the heat exchanger can be prevented from reaching high temperatures.

An exhaust heat recovery device according to a fifth aspect of the present invention comprises a heat exchanger having a heat exchange unit that performs heat exchange between exhaust gas and a coolant medium and is formed at a periphery of an bypass unit arranged along the horizontal direction, and the heat exchanger is configured to be switchable between a state where the exhaust gas flows through the bypass and a state where the exhaust gas flows through the heat exchange unit; and a natural convection channel whose one end is connected to an upper portion in the direction of gravity of a coolant medium channel, whose another end is connected to a lower portion in the direction of gravity of the coolant medium channel, and whose intermediate portion is positioned at an outer side of the heat exchange unit.

With the exhaust heat recovery device of the fifth aspect, a cylindrical heat exchange unit is formed around a bypass unit arranged along the horizontal direction. The coolant medium channel is arranged in the heat exchanging unit so as to exchange heat with the exhaust gas. With this configuration, the exhaust gas amount relative to the coolant medium amount is great in the heat exchanger. The coolant medium channel of the heat exchanger and the natural convection channel form natural convection circulation route where a coolant medium can circulate due to natural convection (i.e., differences in relative density). The natural convection channel links the upper and lower portions of the coolant medium channel in the direction of gravity. Since the intermediate portion of the natural convection channel is positioned at the outer side of the heat exchange unit (heat exchanger), when the coolant medium circulates in the natural convection circulation channel, it releases heat at the intermediate portion of the natural convection channel and to be cooled. Accordingly, although the configuration is such that it does not cause forced flow in the coolant medium channel in the heat exchanger, the coolant medium does not reach high temperatures.

In this manner, with the exhaust heat recovery device of the fifth aspect, the coolant medium inside the heat exchanger can be prevented from reaching high temperatures.

A sixth aspect of the present invention is the exhaust heat recovery device of the fifth aspect, wherein one end of the natural convection channel is connected to an upper side portion in the direction of gravity above a bypass unit in the coolant medium channel, and the other end is connected to a lower side portion in the direction of gravity below the bypass unit.

With the exhaust heat recovery device according to the sixth aspect, the natural convection channel is linked to the coolant medium channel at portions thereof which locate upper and lower sides with respect to the bypass route. For this reason, portions that are not included in the natural convection circulation channel of the coolant medium in the coolant medium channel become small. Due to this, the amount of coolant medium that circulates in the natural convection circulation channel increases, and the coolant medium inside the heat exchanger can be effectively prevented from reaching high temperatures.

The exhaust heat recovery device of according to a seventh aspect of the present invention involves any one of the exhaust heat recovery device of the first through sixth aspects, wherein the coolant medium channel comprises a portion of a coolant medium circulation route where the coolant medium is forcefully circulated when heat exchange is performed between the exhaust gas and the coolant medium, and one end and the other end of the natural convection channel are connected to portions of the coolant medium channel where a pressure differential between the one end and the other end of the natural convection channel becomes lower than a preset value when the coolant medium is forcefully circulated in the coolant medium channel.

With the exhaust heat recovery device of the seventh aspect, when heat exchange is performed between the exhaust gas and the coolant medium, a device such as a pump operates so that the coolant medium is forced to circulate in the coolant medium circulation channel that includes the coolant medium channel of the heat exchanger. Due to this, effective heat exchange can be performed. If, on the other hand, the forced circulation flow (i.e., the operation of the pump) of the coolant medium in the coolant medium circulation channel stops, the residual heat at the exhaust gas side in the heat exchanger is transmitted to the coolant medium of the coolant medium channel. The coolant medium circulates through the natural convection circulation channel configured to include the above-described coolant medium channel and natural convection channel, whereby the coolant medium is prevented to be high temperature.

Here, one end and the other end of the natural convection channel (i.e., the introduction and discharge portions of the coolant medium due to natural convection) are connected to the portions where the pressure differential between the one end and the other end of the natural convection channel becomes under a preset threshold (including no pressure differential) when forced flow circulates in the coolant medium circulation route. For this reason, when forced circulation is generated, flow of the coolant medium into the natural convection channel is suppressed. Accordingly, when the heat exchange is performed between the exhaust gas and coolant medium, heat included in the coolant medium is prevented to be wastefully exhausted to the natural convection channel.

The exhaust heat recovery device according to the eighth aspect of the present invention involves any one of the exhaust heat recovery device of the first through sixth aspects, wherein the coolant medium channel comprises a portion of a coolant medium circulation route where the coolant medium is forcefully circulated when heat exchange between the exhaust gas and the coolant medium is performed.

One end and the other end of the natural convection channel are connected to portions positioned on a plane that is perpendicular to a direction in which forced circulation of the coolant medium flows in the coolant medium channel.

With the exhaust heat recovery device of the eighth aspect, when heat exchange is performed between the exhaust gas and the coolant medium, a pump and the like is operated and the coolant medium is forced to circulate in the coolant medium circulation route that includes the coolant medium channel of the heat exchanger. Due to this, effective heat exchange can be performed. If, on the other hand, the forced circulation flow (i.e., the operation of the pump) of the coolant medium in the coolant medium circulation channel stops, the residual heat at the exhaust gas side in the heat exchanger is transmitted to the coolant medium of the coolant medium channel. The coolant medium circulates through the natural convection circulation channel configured to include the coolant medium channel and natural convection channel, whereby the coolant medium is prevented to become high temperature.

Here, one end and the other end of the natural convection channel (i.e., the introduction and discharge portions of the coolant medium due to natural convection) are linked to the positions located on the plane that is perpendicular to the direction in which forced circulation of the coolant medium flows in the coolant medium channel. For this reason, a pressure differential between the introduction and discharge portions of the coolant medium caused by the forced circulation of the coolant medium is little. Accordingly, flow of the coolant medium into the natural convection channel is suppressed when the forced circulation is generated in the coolant medium circulation route, wasteful release of heat included in the coolant medium to the natural convection channel is prevented.

The exhaust heat recovery device according to the ninth aspect of the present invention involves any one of the exhaust heat recovery device of the first through third aspects, wherein the heat exchanger comprises a shell having an exhaust channel through which the exhaust gas flows and a coolant medium channel provided adjacent to the exhaust channel and through which the coolant medium flows; a first linking channel that is linked to an upper portion in the direction of gravity of the coolant medium channel at one end of the coolant medium channel in the coolant medium flow direction and forms a portion of one end side of the natural convection channel; a second linking channel that is linked to a lower portion in the direction of gravity of the coolant medium channel at the other end of the coolant medium channel in the coolant medium flow direction and forms a portion of the other end side of the natural convection channel; and an insulating unit that insulates a portion of the second linking channel positioned inside the shell from the exhaust gas.

With the exhaust heat recovery device of the ninth aspect, heat exchange is performed between the exhaust gas flowing through the exhaust channel and the coolant medium flowing through the coolant medium channel in the shell. The coolant medium flows in the coolant medium channel from the first linking channel to the second linking channel or from the second linking channel to the first linking channel, and circulates (is forcedly circulated) inside and outside of the shell. At this time, the temperature (rising) of the coolant medium at the second linking channel insulated with the insulation unit are suppressed lower than the temperature of the coolant medium in the coolant medium channel.

Then, when the forced circulation of the coolant medium is stopped, the coolant medium of the second linking channel whose relative density is larger than that of the coolant medium in the coolant medium channel due to its relatively low temperature, a flow is generated downwards due to gravity. The coolant medium flows into the lower portion of the coolant medium channel in the direction of gravity at the other end side of the coolant medium channel in the coolant medium flow direction. Due to this, natural convection of the coolant medium towards the first linking channel side is generated, and the coolant medium is prevented from reaching high temperatures. Further, by providing the insulation unit, a part can be provided inside the shell (i.e., the second linking channel that is the other end of the natural convection channel) where a portion of the coolant medium can be maintained at relatively low temperature. Due to this, the second linking channel is covered and protected by the shell.

An exhaust heat recovery device according to a tenth aspect of the present invention comprises a heat exchanger comprising a shell having an exhaust channel through which the exhaust gas flows and a coolant medium channel provided adjacent to the exhaust channel and through which the coolant medium flows; a first linking channel that links an outside of the shell and an upper portion in the direction of gravity of the coolant medium channel at one end of the coolant medium channel in the coolant medium flow direction; a second linking channel that links the outside of the shell and a lower portion in the direction of gravity of the coolant medium channel at the other end of the coolant medium channel in the coolant medium flow direction; and an insulating unit that insulates a portion of the second linking channel positioned inside the shell from the exhaust gas.

With the exhaust heat recovery device of the tenth aspect, heat exchange is performed between the exhaust gas flowing through the exhaust channel and the coolant medium flowing through the coolant medium channel in the shell. The coolant medium flows in the coolant medium channel from the first linking channel to the second linking channel or from the second linking channel to the first linking channel, and circulates (forcedly circulate) inside and outside of the shell. At this time, the temperature (rising) of the coolant medium at the second linking channel insulated with the insulation unit are suppressed lower than the temperature of the coolant medium in the coolant medium channel.

Then when the forced circulation of the coolant medium is stopped, the coolant medium of the second linking channel whose relative density is larger than that of the coolant medium in the coolant medium channel, due to its relatively low temperature, a flow is generated downwards due to gravity. The coolant medium flows into the lower portion of the coolant medium channel in the direction of gravity at the other end side of the coolant medium channel in the coolant medium flow direction. Due to this, natural convection of the coolant medium towards the first linking channel side is generated, and the coolant medium is prevented from reaching high temperatures. Further, by providing the insulation unit, a part can be provided inside the shell (i.e., the second linking channel) where a portion of the coolant medium can be maintained at relatively low temperature. Due to this, the second linking channel is covered and protected by the shell.

In this manner, with the exhaust heat recovery device of the tenth aspect, the coolant medium inside the shell can be prevented from reaching high temperatures.

An eleventh aspect of the present invention is the exhaust heat recovery device of the ninth or tenth aspects, wherein, when viewed from the exhaust gas flows direction, a portion of the second linking channel excluding a portion penetrating the shell is formed so as to entirely overlap the coolant medium channel.

With the exhaust heat recovery device of the eleventh aspect, when viewing from the exhaust gas flow direction, the second linking channel excluding the portion penetrating the shell entirely overlaps the coolant medium channel and does not impede the flow of exhaust gas, so increases in back-pressure of the exhaust gas are suppressed.

A twelfth aspect of the present invention is the exhaust heat recovery device of the eleventh aspect, wherein, when viewed from the exhaust gas flow direction, the portion of the second linking channel excluding the portion penetrating the shell has a cross-sectional shape identical with a cross-sectional shape of the coolant medium channel.

With the exhaust heat recovery device of the twelfth aspect, when viewing from the exhaust gas flow direction, the second linking channel, excluding the portion penetrating the shell, has identical cross-sectional shape with the coolant medium channel and can maintain the above-described back-pressure suppressing effect while keeping low-temperature coolant medium in order to cause generation of natural convection of the coolant medium.

A thirteenth aspect of the present invention is the exhaust heat recovery device of the eleventh or twelfth aspect, wherein the coolant medium channel forms a cylindrical shape that coaxially surrounds the exhaust channel.

With the exhaust heat recovery device of the thirteenth aspect, the coolant medium channel is formed between, e.g., an inner pipe wall that defines the exhaust channel and an outer pipe wall coaxially provided at an outer side of the inner pipe wall. The second linking channel is provided at either one side of the coolant medium channel in the axial direction.

When forced circulation of the coolant medium is stopped, the coolant medium flow less likely stagnates in natural convection because low-temperature coolant medium flows into a lower portion of the second linking channel which is formed into a cylindrical shape. Temperature increases in the coolant medium in the shell can thus be effectively prevented.

A fourteenth aspect of the present invention is any one of the exhaust heat recovery device of the eleventh through thirteenth aspects, wherein the second linking channel is arranged at the downstream side of the coolant medium channel in the exhaust gas flow direction.

With the exhaust heat recovery device of the fourteenth embodiment, after heat has been absorbed due to heat exchange between the exhaust gas and the coolant medium, the exhaust gas comes in contact with the second linking channel, thereby the heat amount received at the second linking channel from the exhaust gas is small. The temperature of the coolant medium inside the second linking channel can be made to be lower.

A fifteenth aspect of the present invention is any one of the exhaust heat recovery device of the ninth through fourteenth aspects, wherein the second linking channel is formed by partitioning the other end of the coolant medium channel in the coolant medium flow direction with a dividing panel.

With the exhaust heat recovery device of the fifteenth aspect, the coolant medium channel and the second linking channel are integrally formed, i.e., there is no space portion between the coolant medium channel and the second linking channel through which exhaust gas flows. Accordingly, the contact area of the second linking channel with the exhaust gas is small and the coolant medium in the second linking channel can be kept at further lower temperatures.

BRIEF EXPLANATION OF THE DRAWINGS

FIG. 7A is an axial direction cross-sectional drawing showing a heat exchanger according to a third embodiment of the present invention; and FIG. 7B is a cross-sectional drawing along the 7B-7B line of FIG. 7A.

EFFECT OF THE INVENTION

The exhaust heat recovery device according to the present invention, as explained above, exhibits a superior effect to prevent temperature increases of the cooling medium inside the heat exchanger (i.e., shell).

Best Modes for Practicing the Invention

Figure 1:
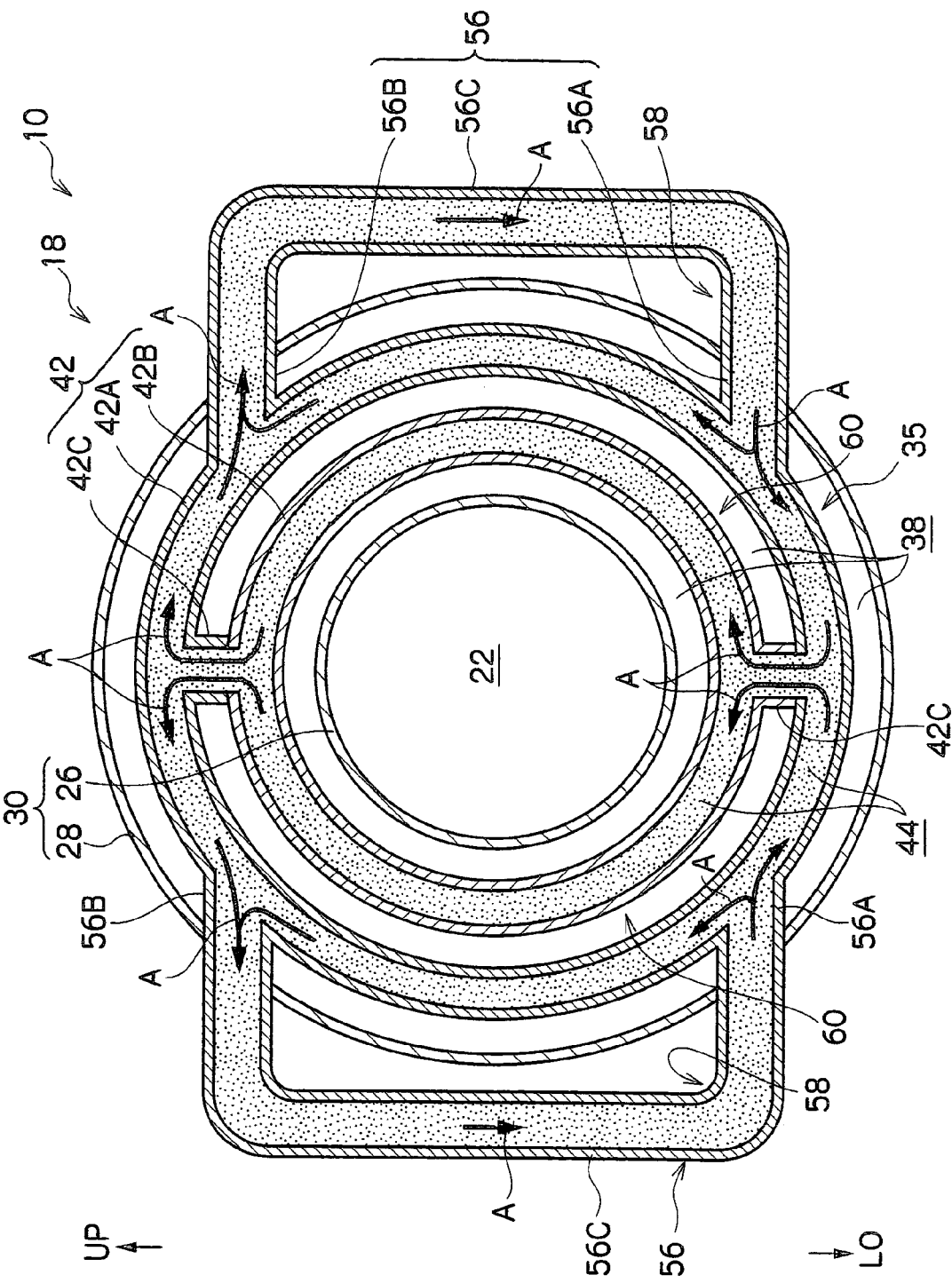
FIG. 1 is a cross-sectional drawing perpendicular to an axial direction of a heat exchanger for exhaust heat recovery that forms an exhaust heat recovery system according to the first embodiment of the present invention.

An exhaust heat recovery system 10 that functions as an exhaust heat recovery device according to a first exemplary embodiment of the present invention will be explained based on FIGS. 1-3. Note that in the following explanations, when terms like upstream and downstream are used, this indicates upstream/downstream side in exhaust gas flow direction. Further, the UP arrow and LO arrow found in each drawing respectively indicate the upper side and lower side in the direction of gravity (i.e., the up and down directions of the vehicle body).

Figure 3:
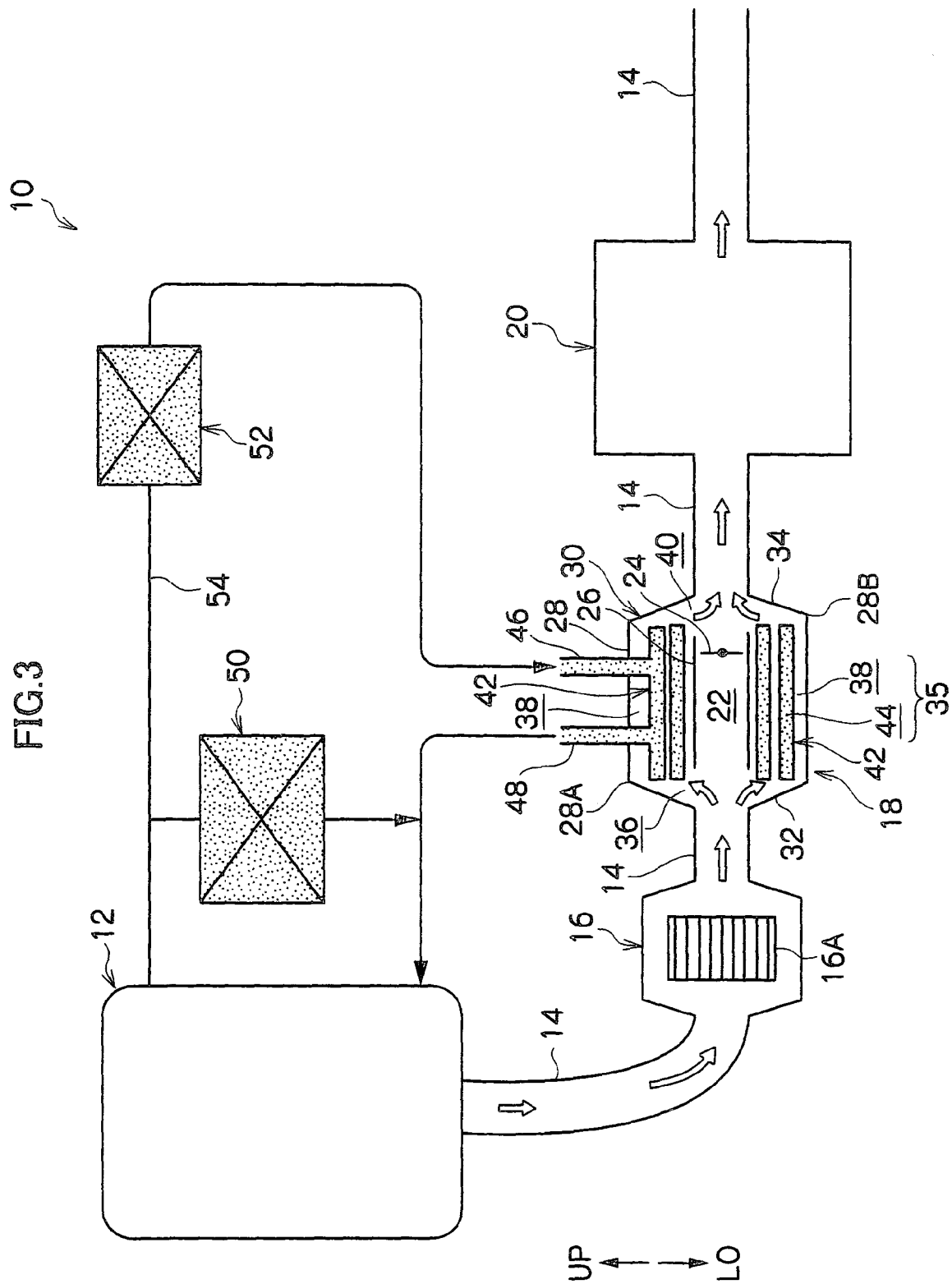
FIG. 3 is a system flow drawing showing the overall configuration of the exhaust heat recovery system according to the first embodiment of the present invention.

The overall general configuration of the exhaust heat recovery system 10 is shown in FIG. 3 as a flow diagram. As shown in this drawing, the exhaust heat recovery system 10 recovers the heat in the exhaust gas of an internal combustion engine 12 of an automobile due to heat exchange with engine coolant water. The recovered heat is used in heating or in acceleration of warm-up of the engine 12.

An exhaust pipe 14 that forms an exhaust route that leads exhaust gas out is connected to the engine 12. A catalyst converter 16, exhaust heat recovery heat exchanger 18 ("heat exchanger 18" hereinafter), and main muffler 20 are arranged in this order from the upstream side on the exhaust route of the exhaust pipe 14. The catalyst converter 16 is configured so as to clean the exhaust gas passing through with a catalyst 16A set therein. The main muffler 20 is configured so as to reduce the exhaust noise that is generated with the discharging of the cleaned exhaust gas into the atmosphere.

The heat exchanger 18 is configured to make the heat of the exhaust gas recover to the engine coolant water by heat exchange between the exhaust gas and the engine coolant water. Also, a bypass channel 22 that acts as a bypass unit for the exhaust gas and a channel switching valve 24 that acts as a channel-switching device for opening and closing the bypass channel 22 are arranged inside the heat exchanger 18. These are configured so as to be able to switch between an exhaust heat recovery mode, where heat exchange between the exhaust gas and engine coolant water is performed, and a normal mode, where the exhaust gas passes through the bypass channel 22. Hereafter, this will be explained in detail.

Figure 2:
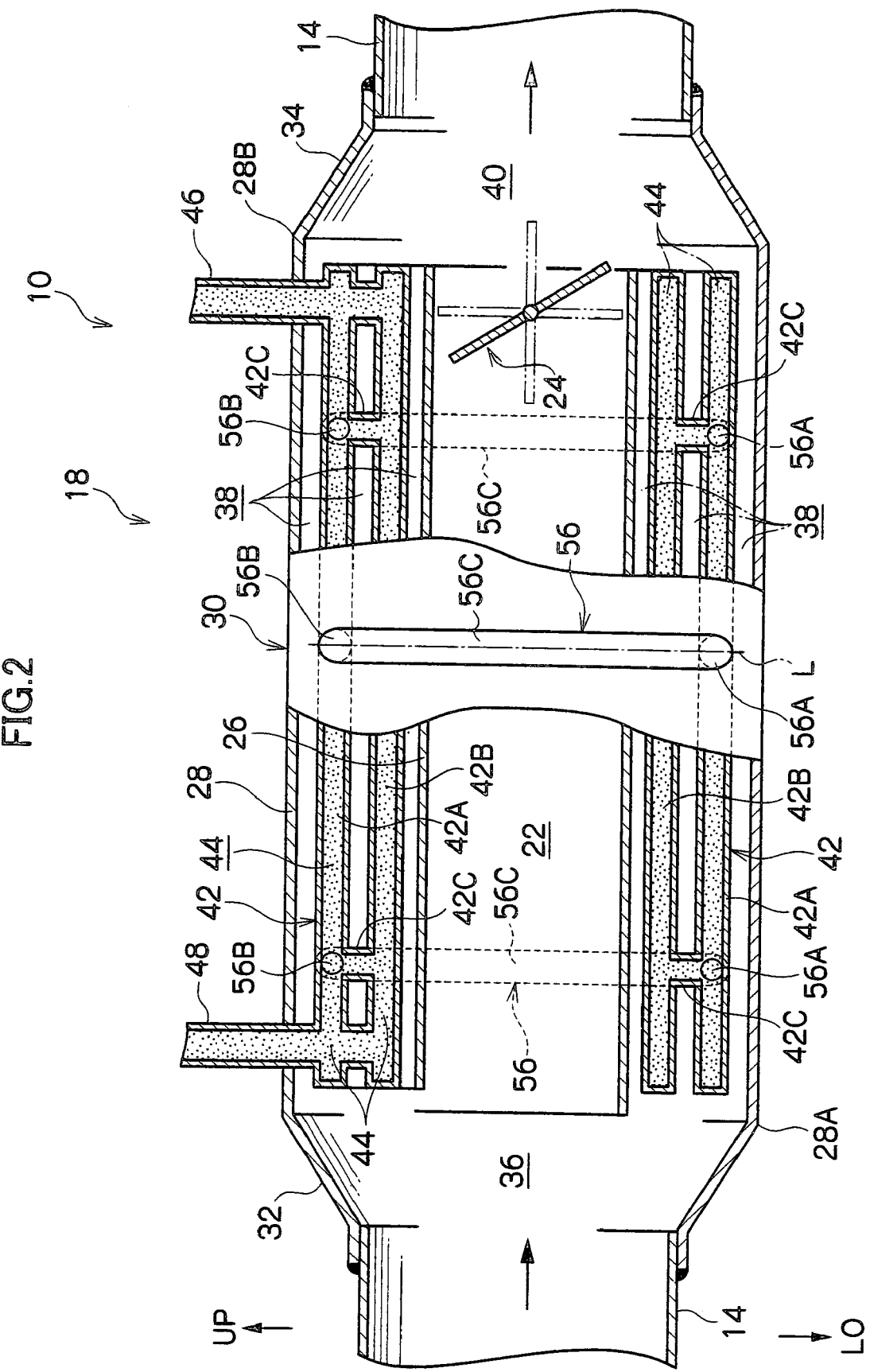
FIG. 2 is an axial direction cross-sectional drawing of the heat exchanger for exhaust heat recovery that forms the exhaust heat recovery system according to the first embodiment of the present invention.

As shown in FIG. 2, the heat exchanger 18 includes an inner pipe 26 and an outer pipe 28 that are each formed cylindrically and arranged coaxially, and is provided with a shell 30 that forms an exhaust gas flow unit. Further, the shell 30 is provided with a conical cylinder 32 that connects an upstream end 28A of the outer pipe 28 with a diameter larger than that of the exhaust pipe 14 and a portion positioned at the catalyst converter 16 side of the exhaust pipe 14; and a conical cylinder 34 that connects a downstream end 28B of the outer pipe 28 and a portion positioned at the main muffler 20 side in the exhaust pipe 14.

The following are formed in the interior of this shell 30, an exhaust entrance header 36 that is a space inside the conical cylinder 32; an exhaust gas heat exchange route 38 that forms the heat exchanging unit that is a cylindrical space formed between the inner pipe 26 and outer pipe 28; the bypass channel 22 that is an interior space of the inner pipe 26 at which the channel switching valve 24 is arranged; and a exhaust exit header 40 that acts as an interflow unit and which is a space inside the conical cylinder 34.

An engine coolant water pipe 42 is arranged inside the exhaust gas heat exchange route 38 of the shell 30 as a channel for coolant medium and the heat exchange unit 35 is formed, and an engine coolant water heat exchange route 44 ("heat exchange route 44" hereinafter) that is a flow channel of the engine coolant water in the heat exchanger 18 is formed. With this exemplary embodiment, the engine coolant water pipe 42 has a four-layer cylindrical structure that forms duplex cylindrically-shaped heat exchange route 44, as shown in FIG. 1. Hereafter, the portion that comprises the heat exchange route 44 at the outer side in the engine coolant water pipe 42 will be referred to as the outer side cylinder 42A, and the portion that comprises the heat exchange route 44 at the outer side of the inner side will be referred to as the inner side cylinder 42B.

The upstream side portions in the engine coolant water flow direction of the outer side cylinder 42A and inner side cylinder 42B of the engine coolant water pipe 42 passes through the outer pipe 28 and are connected to a provided entry port 46 and the downstream side portions in the engine coolant water flow direction passes through the outer pipe 28 and is connected to a provided exit port 48. With this exemplary embodiment, the entry port 46 is arranged at the downstream side of an exhaust gas heat exchange route 38 than the exit port 48, and the heat exchanger 18 is a countercurrent-type heat exchanger.

The heat exchanger 18 is configured so that when the channel switching valve 24 is in the exhaust heat recovery mode where the inner pipe 26 (bypass channel 22) is closed, a heat exchanging function is fulfilled by the exhaust gas flowing to the exhaust gas heat exchange route 38. In the normal mode, where the channel switching valve 24 opens the inner pipe 26, the exhaust gas flows mainly through the bypass channel 22, thereby fulfilling an exhaust bypass function. Note that the flow resistance (pressure loss) of the exhaust gas heat exchange route 38 where the engine coolant water pipe 42 is arranged is greater than the flow resistance of the open bypass channel 22. This is configured so that in a case where the channel switching valve 24 opens the inner pipe 26, almost no exhaust gas flows to the exhaust gas heat exchange route 38.

The channel switching valve 24 is controlled by an ECU (Engine Control Unit) that acts as a control device (not shown) and is designed so that, for example, when there is a requirement for accelerated warm-up of the engine 12 (i.e., when the engine coolant water temperature is under a certain threshold (e.g., 80° C.)), the bypass channel 22 is closed.

The exhaust heat recovery system 10 is also provided with a front heater core 50 and a rear heater core 52 that recover the heat of the engine coolant water for use in the heater, and a heated water path 54 that makes the engine coolant water circulate in the front heater core 50 and rear heater core 52. The front heater core 50 and the rear heater core 52 are arranged in parallel. The heat exchanger 18 is arranged at the downstream side of the rear heater core 52 in the heated water path 54. That is, the entry port 46 is arranged in the heated water path 54 at the rear heater core 52 side and the exit port 48 is arranged at the upstream side of the engine 12 in the heated water path 54. With this exemplary embodiment, the heat exchanger 18 is arranged in the engine coolant water system in parallel to the front heater core 50 and in series with the rear heater core 52.

Accordingly, with the exhaust heat recovery system 10, the system is designed so that the engine coolant water flows in the direction of the arrow indicated on the heated water path 54 of FIG. 3 due to a water pump (not shown) that runs with the operation of the engine 12. Due to this, when the high-temperature heated water that came by way of the engine 12 passes through the front heater core 50 and the rear heater core 52, the water undergoes heat exchange and recovered heat is used in the heater. The engine coolant water cooled at the rear heater core 52 is introduced to the heat exchanger 18 and, when necessary (i.e., depending on control by the ECU), is made to exchange heat with the exhaust gas. The system is designed so that the engine coolant water that passed through the heat exchanger 18 is returned to the engine 12 with the engine coolant water that passed through the front heater core 50. In this manner, from the viewpoint of engine warm-up, the heat exchanger 18 is configured to function as a heater that heats the engine coolant water prior to its introduction to the engine 12.

The heat exchanger 18 that comprises the exhaust heat recovery system 10 is provided with a natural convection water pipe 56 that links the upper and lower portions in the direction of gravity of the outer side cylinder 42A and whose intermediate portion is positioned at an outer side of the shell 30. More specifically, the main structural portions of the natural convection water pipe 56 are a coolant water introducing unit 56A that is connected to a portion provided at lower side than the inner pipe 26 (bypass channel 22) of the outer side cylinder 42A; a coolant water discharger 56B connected to a portion provided higher side than the inner pipe 26 of the outer side cylinder 42A; and a heat releaser 56C that penetrates through the outer pipe 28 and is positioned at an outer side of the shell 30, i.e., the heat exchanger 18.

Due to this, with the exhaust heat recovery system 10, a first annular natural convection circulation route 58 is formed with the natural convection water pipe 56 and the portion between the coolant water introducing unit 56A and the coolant water discharger 56B located substantially in the direction of gravity in the outer side cylinder 42A. In this exemplary embodiment, as shown in FIG. 1, the natural convection water pipe 56 (i.e., the natural convection circulation route 58) is provided at both left and right sides with respect to the inner pipe 26. Also, as shown in FIG. 2, plural natural convection water pipes 56 are provided along the exhaust gas flow direction.

Each of the natural convection water pipe 56 as described above has the coolant water introducing unit 56A and coolant water discharger 56B that, when viewed from the side, are arranged on a plane orthogonal to the axial direction of the engine coolant water pipe 42 (outer side cylinder 42A). More specifically, from a side view, the imaginable straight line L that connects the coolant water introducing unit 56A and the coolant water discharger 56B is arranged to be positioned substantially perpendicular to the axial direction of the engine coolant water pipe 42.

Here, with the outer side cylinder 42A, the engine coolant water that flows in from the entry port 46 and flows out from the exit port 48 flows substantially uniformly overall from the entry port 46 side towards the exit port 48 side. Accordingly, the device is configured so that, upon forced circulation where the engine coolant water circulates due to the water pump action in the heated water path 54 that includes the engine coolant water pipe 42, almost no pressure difference is generated between the coolant water introducing unit 56A and the coolant water discharger 56B arranged, as described above, on the imaginable straight line L (when viewed from the side). That is, the pressure differential or the pressure ratio remains within a set value. Due to this, upon forced circulation due to the water pump action, the flowing in of engine coolant water to the natural convection water pipe 56 is prevented.

Further, a pair of upper and lower linking tube unit 42C that link each of the outer side cylinder 42A to the inner side cylinder 42B are provided at the engine coolant water pipe 42 at the positions where each of the natural convection water pipe 56 are provided in the direction in which the coolant water flows. Due to this, with the exhaust heat recovery system 10, a second natural convection circulation route 60 is formed by the substantially half portion either in the left or right direction of the inner side cylinder 42B; the natural convection water pipe 56; and the portions that is included in the outer side cylinder 42A and link the half portion of the inner side cylinder 42B and the natural convection water pipe 56. The natural convection circulation route 60 includes a heat releaser 56C positioned at an out side of the heat exchanger 18 and is in parallel with the first natural convection circulation route 58.

Furthermore, the exhaust heat recovery system 10 is designed so that the space between the inner pipe 26 and the inner side cylinder 42B in the exhaust gas heat exchange route 38 functions as an exhaust channel when the system is in exhaust heat recovery mode. In the normal mode, it functions as a heat-insulating air layer that separates the bypass channel 22 (through which high-temperature exhaust gas flows) and the heat exchange route 44.

Next, the effects of the first exemplary embodiment will be explained.

With the exhaust heat recovery system 10 configured as described above, when the temperature of the engine coolant water is low, such as immediately after starting the engine 12, the ECU drives the channel switching valve 24 to close based on, e.g., a requirement to accelerate warming up, and makes the bypass channel 22 close. That is, exhaust heat recovery mode is selected. When this occurs, the exhaust gas of the engine 12 is introduced into the exhaust gas heat exchange route 38 of the heat exchanger 18 without flowing to the bypass channel 22. Heat exchange is performed between the exhaust gas introduced to the exhaust gas heat exchange route 38 and the engine coolant water, and the exhaust gas makes the engine coolant water heat up. Due to this, warm-up of the engine 12 is accelerated.

On the other hand, if the temperature of the engine coolant water rises and exceeds a threshold, the ECU operates the channel switching valve 24 to open and makes the bypass channel 22 open. That is, it switches from exhaust heat recovery mode to normal mode. When this happens, the exhaust gas flows through mainly the bypass channel 22. In this case as well, due to the action of the engine 12 (i.e., the water pump), the engine coolant water circulates through the heated water path 54 including the engine coolant water pipe 42.

Then when the engine 12 stops, the action of the water pump ceases and forced circulation of the engine coolant water due to the water pump stops. While this is happening, the high-temperature state of the inner pipe 26 (bypass channel 22) of the heat exchanger 18 is maintained for a while after the engine 12 stops. Heat from this high-temperature bypass channel 22 is transmitted to the engine coolant water in the engine coolant water pipe 42.

With the exhaust heat recovery system 10, the natural convection water pipe 56 that links the top and bottom of the outer side cylinder 42A is provided so that the first natural convection circulation route 58 is formed by the natural convection water pipe 56 and a portion of the outer side cylinder 42A. Further, the second natural convection circulation route 60 is formed by the natural convection water pipe 56, a portion of the outer side cylinder 42A and right or left half of the inner side cylinder 42B. The engine coolant water in the natural convection circulation routes 58 and 60 generates natural convection as indicated by arrows A in FIG. 1 due to the specific gravity difference that is generated between the engine coolant water positioned at upper side and lower side in the circulation routes 58 and 60. The specific gravity difference is caused by a temperature difference of the engine coolant water that is attributed to the transmitted heat from the bypass channel 22 to the engine coolant water in the engine coolant water pipe 42 after the water pump operation stoppage. The engine coolant water that passes through the heat releaser 56C with this circulation is cooled by heat exchange with the air. Due to this, abnormal rises in temperature and boiling of the engine coolant water is prevented.

Portions that do not form the natural convection circulation route 58 in the outer side cylinder 42A are few since upper and lower parts of the outer side cylinder 42A with respect to the bypass channel 22 are linked with the natural convection water pipe 56. Accordingly, the amount of engine coolant water that circulates through the natural convection circulation route 58 and is cooled at the heat releaser 56C increases. Due to this, rises in temperature of the engine coolant water are effectively prevented. With the exhaust heat recovery system 10, the engine coolant water temperature rise can be prevented by the natural convection circulation without use of a power such as an electric motor when the engine 12 is stopped.

Note that the coolant water introducing unit 56A and coolant water discharger 56B of the natural convection water pipe 56 are arranged on the plane that is perpendicular to the coolant water flow direction (axial line direction) in the outer side cylinder 42A (or along the imaginable straight line L in FIG. 2 when viewed from the side). In other words, there is no pressure differential between the coolant water introducing unit 56A and the coolant water discharger 56B when the engine coolant water is undergoing forced circulation through the heated water path 54. For this reason, with the exhaust heat recovery system 10, the engine coolant water does not flow into the natural convection water pipe 56 in either the case of exhaust heat recovery mode or normal mode. Hence, when stopping the engine 12 as described above, it fulfills that the function of preventing temperature increases of the engine coolant water, while preventing wasteful or unnecessary cooling of the engine coolant water due to heat release at the heat releaser 56C when the engine 12 is in operation.

With the exhaust heat recovery system 10 according to the first exemplary embodiment of the present invention, the exhaust capacity is large due to the arrangement of the bypass channel 22 in the central portion. In this configuration, where it is likely for the temperature of the engine coolant water to become high when the engine 12 is off, however, the temperature rising of the coolant water in the engine coolant water pipe 42 can be prevented.

Figure 4:
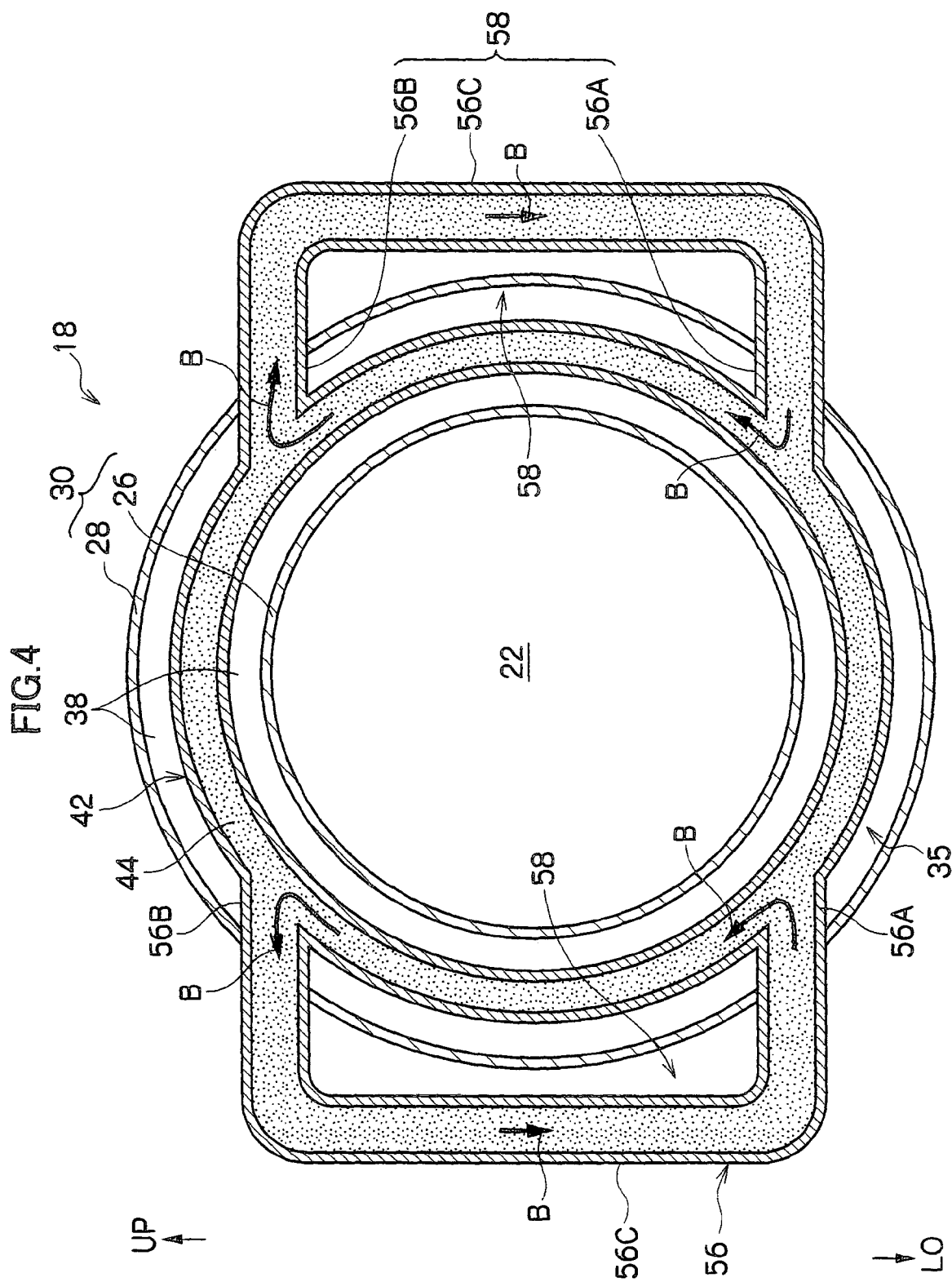
FIG. 4 is a cross-sectional drawing perpendicular to an axial direction of an alternate example of the heat exchanger for exhaust heat recovery that forms the exhaust heat recovery system according to the first embodiment of the present invention.

Note that with the above-described exemplary embodiment, an example is shown where the engine coolant water pipe 42 forms a duplex cylindrical heat exchange route 44, however, the present invention is not thus limited. For example, as shown in FIG. 4, the engine coolant water pipe 42 can also be configured to form a single cylindrical heat exchange route 44. In this case, the natural convection circulation route 58 is formed to create a simple route of convection with the natural convection water pipe 56 (refer to B arrows).

Next, another exemplary embodiment of the present invention will be explained. Note that there are cases where parts and components that have essentially the same configurations as in the first exemplary embodiment are given the same numbers as in the first exemplary embodiment, and explanations thereon are omitted.

(Second Exemplary Embodiment)

Figure 6:
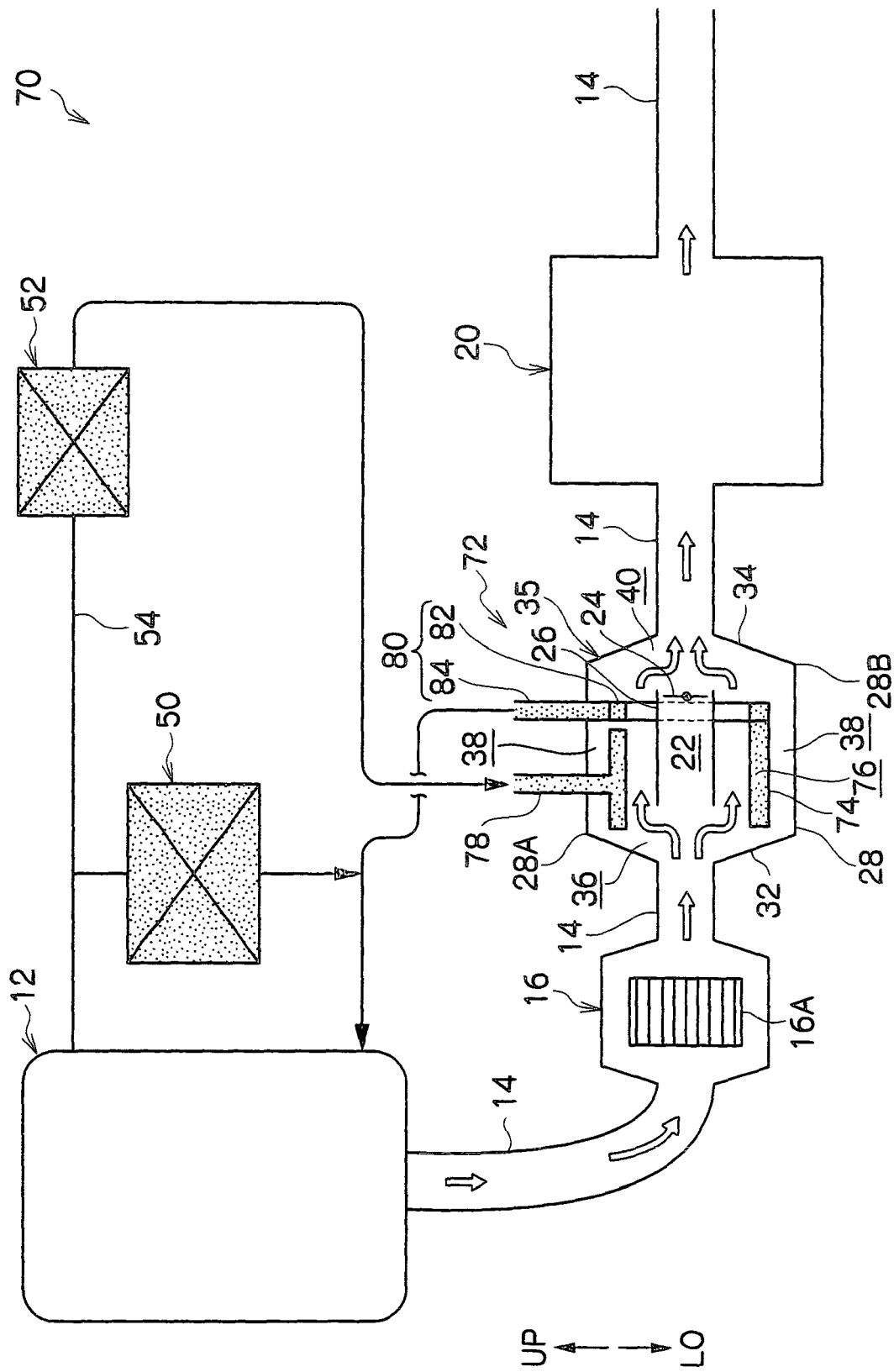
FIG. 6 is a system flow diagram of the exhaust heat recovery system to which the heat exchanger according to the second embodiment of the present invention is applied.

A flow diagram of the general overall configuration of an exhaust heat recovery system 70 that is the exhaust heat recovery device according to the second exemplary embodiment is shown in FIG. 6. As shown in this drawing, the exhaust heat recovery system 70 differs from the first exemplary embodiment in that the heat exchanger. The heat exchanger 18 in the first exemplary embodiment is provided with the natural convection water pipe 56 that protrudes towards the outer side of the outer pipe 28. On the contrary, an exhaust heat recovery heat exchanger 72 ("heat exchanger 72" hereinafter) has no natural convection water pipe 56.

Figure 5:
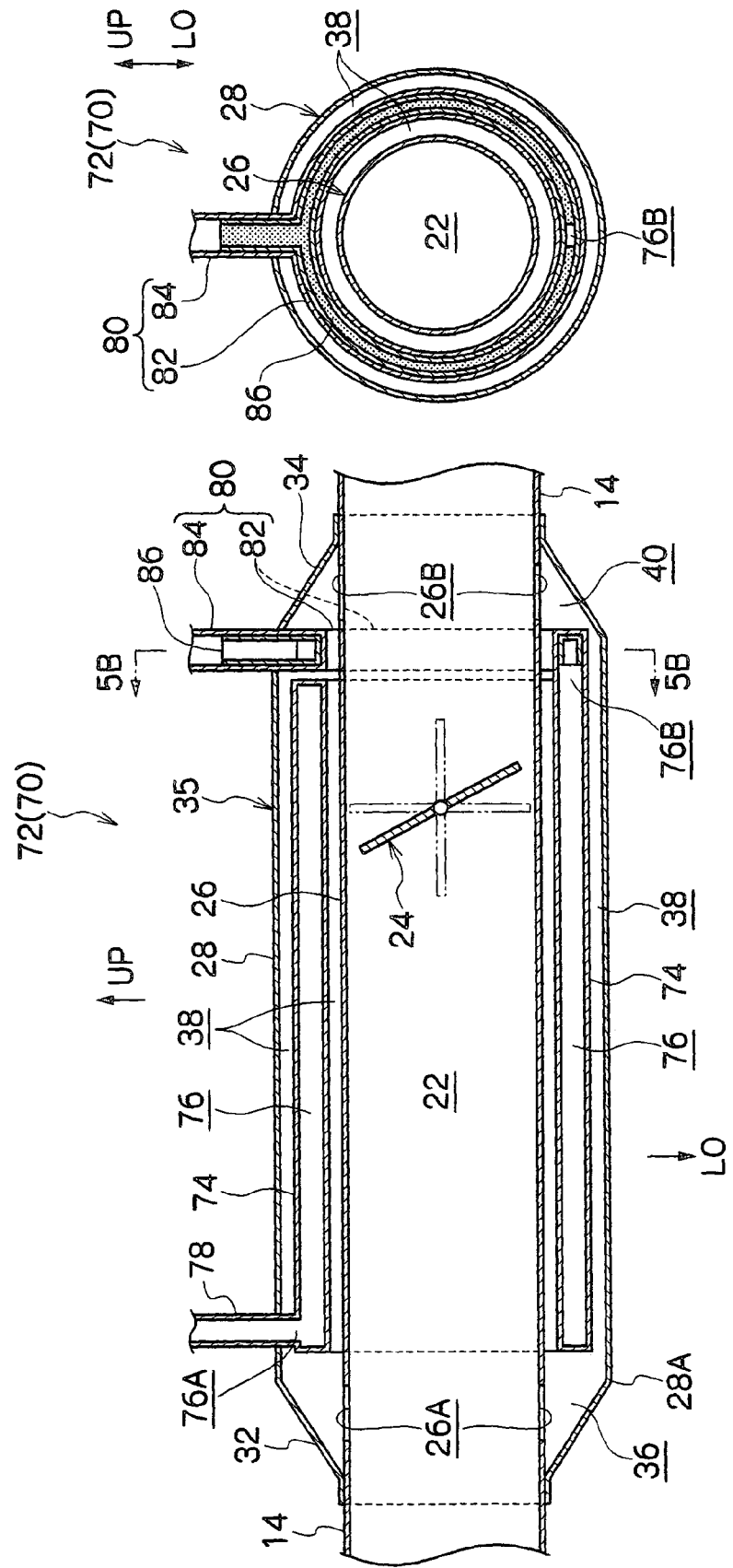
FIG. 5A is an axial direction cross-sectional drawing showing a heat exchanger for exhaust heat recovery according to a second embodiment of the present invention.
FIG. 5B is a cross-sectional drawing along the 5B-5B line of FIG. 5A.

With the heat exchanger 72, as shown in FIGS. 5A and 5B, the inner pipe 26 is arranged so that the direction of the axis line matches the horizontal direction (e.g., the front and rear directions of the vehicle). The inner pipe 26 passes through the central axis portion of the outer pipe 28, which is separately defined as a shell. Both ends of the inner pipe 26 in the axial direction are connected to the exhaust pipe 14. The inner pipe 26 can also be configured so as to be a part of the exhaust pipe 14. Further, the heat exchanger 72 is provided with the conical cylinder 32, whose upstream end is fixed in an airtight state to the outer periphery of the inner pipe 26 and whose downstream end is connected to the upstream end 28A of the outer pipe 28. The heat exchanger 72 is also provided with the conical cylinder 34, whose downstream end is fixed in an airtight state to the outer periphery of the inner pipe 26 and whose upstream end is connected to the downstream end 28B of the outer pipe 28.

A heat exchange unit 35 in this heat exchanger 72 has formed therein the exhaust entrance header 36, which is a space between the inner pipe 26 and the conical cylinder 32; an exhaust gas heat exchange route 38, which is a cylindrical space formed between the inner pipe 26 and the outer pipe 28; and the exhaust exit header 40, which is a space between the inner pipe 26 and the conical cylinder 34. The interior of the inner pipe 26 is made into the aforementioned bypass channel 22. A heat exchanger entrance hole 26A that is provided at the inner side portion of the conical cylinder 32 and which is linked to the exhaust entrance header 36 is formed at the inner pipe 26, and a heat exchanger exit hole 26B that is provided at the inner side portion of the conical cylinder 34 and which is linked to the exhaust exit header 40 is formed at the inner pipe 26.

A coolant water pipe 74 is arranged inside the exhaust gas heat exchange route 38, and this comprises a coolant water heat exchange route 76 ("heat exchange route 76" hereinafter), which is the engine coolant water channel in the heat exchanger 72. In this exemplary embodiment, the coolant water pipe 74 forms a cylindrical heat exchange route 76 at the inner side of the duplex cylinders. A coolant water entrance pipe 78 as a first linking channel is connected to the coolant water pipe 74 at the upstream side in a coolant water flow direction (i.e., the direction of forced circulation). The coolant water entrance pipe 78 penetrates the outer pipe 28 and links a coolant water entry port 76A with an outer portion of the outer pipe 28 (i.e., the heated water path 54, which will be described later). The coolant water entry port 76A is positioned at the uppermost portion in the gravity direction of the cylindrically-shaped heat exchange route 76 whose axial direction matches in the horizontal direction.

Also, a coolant water exit port 76B is positioned at the downstream side in a coolant water flow direction (i.e., the direction of forced circulation) at the coolant water pipe 74. The coolant water exit port 76B is positioned at the lowermost portion in the direction of gravity of the coolant water pipe 74 while opens towards the downstream side in the exhaust gas flow direction. A coolant water exit pipe 80 as a second linking channel is connected to the coolant water exit port 76B. The coolant water exit pipe 80 is annularly formed so that both the inner and outer diameters thereof match the inner and outer diameters of the coolant water pipe 74. The coolant water exit pipe 80 is configured to include a ring pipe 82 that is arranged coaxially with the coolant water pipe 74 at downstream side in the exhaust gas flow direction, and an exit port 84 that penetrates the outer pipe 28 and links the uppermost portion in the direction of gravity of the ring pipe 82 with an outer portion of the outer pipe 28. Accordingly, the coolant water exit port 76B of the heat exchange route 76 is linked to the outer side of the outer pipe 28 through the coolant water exit pipe 80.

When viewed from the upstream side in the exhaust gas flow direction, entire shape of the ring pipe 82 overlaps with the coolant water pipe 74 so that the ring pipe 82 is entirety hidden behind the coolant water pipe 74 (i.e., no portion thereof visible). In this exemplary embodiment, the ring pipe 82 is positioned in the vicinity of the boundary between the exhaust gas heat exchange route 38 and the exhaust exit header 40, and is slightly separated from the downstream end of the coolant water pipe 74.

An insulator 86 is provided at the coolant water exit pipe 80 as an insulating unit and has a heat-insulating structure. The insulator 86 is provided across substantially the entire periphery at each of the inner surfaces of the ring pipe 82 and exit port 84 that form the coolant water exit pipe 80, and it insulates the interior of the coolant water exit pipe 80 from the exhaust gas. Note that the insulator 86 can also be provided on the outer surface of the coolant water exit pipe 80 (on both the inner and outer surfaces), however, it is preferable that its entire outer shape overlaps with the coolant water pipe 74. For the insulator 86, a material such as silicon, heat-resistant resin, glass wool or ceramic wool retained on a steel plate and the like is used.

With the heat exchanger 72 that was explained above, the configuration is made so when the channel switching valve 24 closes the inner pipe 26 (the bypass channel 22), this fulfills a heat-exchanging function due to exhaust gas flowing in the exhaust gas heat exchange route 38. When the channel switching valve 24 opens the inner pipe 26, the exhaust gas flows mainly through the bypass channel 22 and fulfills an exhaust bypass function. Note that the flow resistance (pressure loss) of the exhaust gas heat exchange route 38 where the coolant water pipe 74 is arranged is greater than the flow resistance of the open bypass channel 22. This is configured so that in a case where the channel switching valve 24 opens the inner pipe 26, almost no exhaust gas flows to the exhaust gas heat exchange route 38.

The channel switching valve 24 is controlled by an ECU that acts as a control device (not shown) and is designed so that, for example, when there is a requirement for accelerated warm-up of the engine 12 or heating in case that the temperature of the engine coolant water is low, the bypass channel 22 is closed.

The exhaust heat recovery system 70 is also provided, as in the exhaust heat recovery system 10, with a front heater core 50 and a rear heater core 52 that recover the heat of the engine coolant water for use in the heater, and a heated water path 54 that makes the engine coolant water circulate to the front heater core 50 and rear heater core 52. The front heater core 50 and the rear heater core 52 are arranged in parallel to the engine 12. The heat exchanger 72 is arranged at the downstream side of the rear heater core 52 in the heated water path 54. That is, the coolant water entrance pipe 78 is arranged at the rear heater core 52 side in the heated water path 54 and the exit port 84 of the coolant water exit pipe 80 is arranged at the upstream side of the engine 12 in the heated water path 54. With this exemplary embodiment, the heat exchanger 72 is arranged in parallel with the front heater core 50 and in series with the rear heater core 52 in the engine coolant water system.

Accordingly, with the exhaust heat recovery system 70, the system is designed so that the engine coolant water flows in the direction indicated with the arrows shown on the heated water path 54 of FIG. 6. Due to this, the configuration is such where the high-temperature heated water that passed through the engine 12 flows through the front heater core 50 and the rear heater core 52, and that water undergo heat exchange and recovered heat is used in the heater. The engine coolant water cooled at the rear heater core 52 is introduced to the heat exchanger 72 and is made to exchange heat with the exhaust gas. The engine coolant water that passed through the heat exchanger 72 is returned to the engine 12 with the engine coolant water that passed through the front heater core 50. In this manner, for a heating operation, the heat exchanger 72 functions as a preheating device that preheats the engine coolant water prior to its being heated by the engine 12.

That is, with this exemplary embodiment, the heated water path 54 for forced circulation of the engine coolant water corresponds to a "natural convection channel" that forms a part of a natural convection circulation path for making the engine coolant water undergo natural convection.

Next, the action of the second exemplary embodiment will be explained.

With the exhaust heat recovery system 70 configured as described above, when the temperature of the engine coolant water is low, such as immediately after starting the engine 12, the ECU drives the channel switching valve 24 to close based on, e.g., a requirement for heating or acceleration of warming up the engine 12, and makes the bypass channel 22 close. That is, the exhaust heat recovery mode is selected. The exhaust gas of the engine 12 is introduced into the exhaust gas heat exchange route 38 of the heat exchanger 72 without flowing to the bypass channel 22. Heat exchange is performed between the exhaust gas introduced to the exhaust gas heat exchange route 38 and the engine coolant water in the heat exchanger 72, and the exhaust gas makes the engine coolant water heated. Due to this, heating is accelerated or the engine 12 is warmed up.

On the other hand, if the temperature of the engine coolant water rises and exceeds a threshold, the ECU operates the channel switching valve 24 to open and makes the bypass channel 22 open. That is, it switches from exhaust heat recovery mode to normal mode. When this happens, the exhaust gas mainly flows through the bypass channel 22. In this case as well, due to the action of the engine 12 (i.e., the water pump), the engine coolant water circulates through the heated water path 54 including the coolant water pipe 74.

Then when the engine 12 stops, the water pump ceases its operation and forced circulation of the engine coolant water by the water pump stops. The high-temperature state of the inner pipe 26 (bypass channel 22) of the heat exchanger 72 is maintained for a while after the engine 12 stops. Heat from this high-temperature bypass channel 22 is transmitted to the engine coolant water in the coolant water pipe 74.

With the heat exchanger 72, the insulator 86 is provided at the coolant water exit pipe 80. For this reason, the engine coolant water temperature in the coolant water exit pipe 80 (where the amount of heat received from the exhaust gas is relatively small) is lower and its relative density is higher than the engine coolant water temperature and its relative density in the heat exchange route 76 (where the exhaust gas heat is transmitted from the bypass channel 22 after the water pump operation stoppage). Accordingly, the engine coolant water in the coolant water exit pipe 80 generates a downward flow due to gravity, and flows, from the coolant water exit port 76B, into the lowermost portion at one end in the longitudinal direction of the heat exchange route 76. Due to this, the engine coolant water inside the heat exchange route 76 is pushed out and a flow towards the coolant water entry port 76A is generated. That is, natural convection of engine coolant water occurs inside the heat exchanger 72 (outer pipe 28).

In this manner, since natural convection (i.e., circulation flow) of the engine coolant water occurs when the engine 12 is stopped, excessive temperature increases and boiling of the engine coolant water are prevented. Especially with the heat exchanger 72, the exhaust capacity is large due to the arrangement of the bypass channel 22 in the central portion. In this configuration, it is likely for the engine coolant water temperature becomes high when the engine 12 is off, however, by providing the coolant water exit pipe 80 (mainly the ring pipe 82) and the insulator 86, high temperatures of the coolant water in the coolant water pipe 74 can be prevented.

Additionally, with the heat exchanger 72, no electrical power is consumed as compared with in configurations where a device (e.g., an electrical pump) is used to create a forced circulation flow of the engine coolant water when the engine 12 is stopped. For this reason, fuel consumption is not affected while avoiding excessive increases in temperature and boiling of the engine coolant water.

Further, with this heat exchanger 72, when viewing in the exhaust gas flow direction, the cross-sectional shape of the ring pipe 82 is substantially the same as that of the coolant water pipe 74, and it is hidden behind the back surface of the coolant water pipe 74 so that the ring pipe 82 does not impede the exhaust gas flow. Accordingly, by providing the coolant water exit pipe 80 that includes the ring pipe 82, increases in the back-pressure of the exhaust gas flow are prevented. Further, since the cross-sectional shape of the ring pipe 82 matches substantially with the cross-sectional shape of the heat exchange route 76, the above-described effect of suppressing the back-pressure can be maintained while increasing the retained amount of low-temperature engine coolant water.

With the heat exchanger 72, as the heat exchange route 76 is formed into a cylindrical shape, the system 70 is configured so that the desired surface area is retained while an engine coolant water channel (a single one in the present exemplary embodiment) is formed in the circulation direction of the engine coolant water. For this reason, the occurrence of stagnation of the engine coolant water becomes less likely due to natural convection, and temperature increases in the coolant water in the heat exchange unit 35 (outer pipe 28) can be effectively prevented.

Also, with the heat exchanger 72, since the ring pipe 82 is positioned at the downstream side in the exhaust gas flow direction with respect to the coolant water pipe 74, the amount of heat received from the exhaust gas in the ring pipe 82 becomes less. For this reason, the temperature of the engine coolant water inside the ring pipe 82 can be further lowered. Accordingly, natural convection during when the engine 12 is stopped can be accelerated.

With the heat exchanger 72, by providing the insulator 86, the relative density of the engine coolant water inside the ring pipe 82, which is arranged in the outer pipe 28, becomes relatively heavy. The ring pipe 82 is prevented from damages due to flying rocks and the like during vehicle travel as compared with a configuration that a portion of the coolant water channel is arranged by the coolant water pipe 74 at the outer side of the outer pipe 28. That is, the ring pipe 82 is protected by the outer pipe 28.

(Third Exemplary Embodiment)

Next, an exhaust heat recovery heat exchanger 90 ("heat exchanger 90" herein after) that functions as an exhaust heat exchanger that forms the exhaust heat recovery system according to the third exemplary embodiment of the present invention will be explained while referring to FIG. 7.

A cross-sectional drawing of the heat exchanger 90 is shown in FIG. 7A, and a cross-sectional drawing along the 7B-7B lines of FIG. 7A is shown in FIG. 7B. As shown in these drawings, the heat exchanger 90 differs from the heat exchanger 72 according to the second exemplary embodiment in that, in the ring pipe 82 where the coolant water exit pipe 80 is a separate part from the coolant water pipe 74, the heat exchanger 90 includes a ring-shaped pipe route 92 that is integrally provided with the coolant water pipe 74.

Specifically, the ring-shaped pipe route 92 is provided with a dividing panel 94 at the downstream side end of the coolant water pipe 74, whereby the ring-shaped pipe route 92 is formed as an engine coolant water route (a second linking channel) partitioned from the heat exchange route 76. The dividing panel 94 is formed as a ring-shaped portion so as to correspond to the cross-sectional shape of the heat exchange route 76 (coolant water pipe 74) and is cut the lowermost portion thereof off along the horizontal direction. A portion that extends upwards from the uppermost part of the ring-shaped portion enters into the exit port 84. Due to this, the ring-shaped pipe route 92 and the heat exchange route 76 are linked through a coolant water exit port 76B that is formed as the cutoff portion of the dividing panel 94.

As with the ring pipe 82, the insulator 86 is provided at the ring-shaped pipe route 92 formed in this manner. Other configurations besides that of the heat exchanger 90 are the same as the corresponding configurations of the heat exchanger 72.

Accordingly, with the heat exchanger 90 according to the third exemplary embodiment of the present invention, the same function as well as the same effect can be obtained as that of the heat exchanger 72 according to the second exemplary embodiment. Further, with the heat exchanger 90, since the ring-shaped pipe route 92 is integrally formed with the coolant water pipe 74, a gap through which exhaust gas can flow is not formed between the coolant water pipe 74 and the ring-shaped pipe route 92, different from the heat exchanger 72 in the second exemplary embodiment. Therefore, a contact area between the ring-shaped pipe route 92 and the exhaust gas becomes small. For this reason, the heat amount the ring-shaped pipe route 92 receives from the exhaust gas is further lessened, and it becomes possible to maintain the low temperature of the engine coolant water inside the ring-shaped pipe route 92.

Note that with the above-described second and third exemplary embodiments, examples are shown where the coolant water entrance pipe 78 is the entry port for the engine coolant water in the forced circulation flow and the coolant water exit pipe 80 is the exit port (i.e., a parallel flow-type heat exchanger), however, the present invention is not thus limited. For example, the system can be made so that the engine coolant water is introduced from the exit port 84 of the coolant water exit pipe 80 in forced circulation and discharged from the coolant water entrance pipe 78.

Further, with the above-described second and third exemplary embodiments, examples are shown where the heat exchange route 76 is formed at a single coolant water pipe 74, however, the present invention is not thus limited. For example, the heat exchange route 76 can be formed as plural e coaxial cylinders, or can be formed with plural straight tubes.

Further, with the above-described second and third exemplary embodiments, examples are shown where the bypass channel 22 is formed inside the inner pipe 26 that comprises the heat exchanger 72 however, the present invention is not thus limited. For example, the bypass channel 22 can be provided as pipes arranged at a side of the heat exchanger 72 in parallel. Also, the present invention can be applied to an exhaust heat recovery device not having the bypass channel 22.

The invention claimed is:

1. An exhaust heat recovery device comprising:
   a heat exchanger comprising:
      a shell having an exhaust channel through which the exhaust gas flows and a coolant medium channel provided adjacent to the exhaust channel through which the coolant medium flows;
      a first linking channel that communicates an outside of the shell and an upper portion of the coolant medium channel in the direction of gravity at one end of the coolant medium channel in the coolant medium flow direction;
      a second linking channel that communicates the outside of the shell and a lower portion of the coolant medium channel in the direction of gravity at the other end of the coolant medium channel in the coolant medium flow direction, the second linking channel including a ring pipe that is arranged coaxially with the coolant medium channel at a downstream side of the exhaust gas flow direction; and
      a heat insulating unit that insulates a portion of the second linking channel positioned inside the shell from the exhaust gas.

2. The exhaust heat recovery device of claim 1, wherein, when viewed from the direction in which the exhaust gas flows, the coolant medium channel entirely overlaps a portion of the second linking channel, excluding a portion penetrating the shell.

3. The exhaust heat recovery device of claim 2, wherein, when viewed from the direction in which the exhaust gas flows, the portion of the second linking channel excluding the portion penetrating the shell has a cross-sectional shape identical with a cross-sectional shape of the coolant medium channel.

4. The exhaust heat recovery device of claim 2, wherein the coolant medium channel forms a cylindrical shape that coaxially surrounds the exhaust channel.

5. The exhaust heat recovery device according to claim 2, wherein the second linking channel is arranged at the downstream side of the coolant medium channel in the exhaust gas flow direction.

6. The exhaust heat recovery device according to claim 1, wherein the second linking channel is formed by partitioning the other end of the coolant medium channel in the coolant medium flow direction with a dividing panel.

7. The exhaust heat recovery device according to claim 1, wherein the second linking channel is slightly separated from the upper portion of the coolant medium channel.

* * * * *